UNITED STATES PATENT OFFICE 2,618,617

PROCESS FOR THE PREPARATION OF OIL-MODIFIED ALKYD RESINS

Leonard E. Cadwell, Stamford, Conn., and Charles Frazier, Brooklyn, N. Y., assignors to American Cyanamid Company, New York, N. Y., a corporation of Maine No Drawing. Application August 30, 1950, Serial No. 182,406

9 Claims. (Cl. 260—22)

This invention relates to a process for preparing oil modified alkyd resins and, more particularly, to a process of preparing alkyd resins by reacting a methyl ester of a non-hydroxylated oil fatty acid, a polycarboxylic acid and a saturated polyhydric aliphatic alcohol containing only primary hydroxy groups to the virtually complete exclusion of any polyhydric alcohols containing hydroxy groups other than primary hydroxy groups. This invention further relates to a process for the production of oil modified alkyd resins which are particularly useful for surface coatings, printing inks, floor coverings and the like, and particularly in those fields of application where alkyd resins are desirable which have maximum color retention and heat resistance.

One of the objects of the present invention is to produce an oil modified alkyd resin by reacting a methyl ester of a non-hydroxylated oil fatty acid, a polycarboxylic acid and a polyhydric alcohol containing no hydroxy groups other than the primary hydroxy groups. A further object of the present invention is to produce an oil modified alkyd resin which is suitable for use, particularly in surface coatings by a process which can be practiced at a lower cost than the conventional processes and yet the oil modified alkyd resins thus produced have unusually good solvent tolerances, light color, excellent color retention and excellent heat resistance. A further object of the present invention is to produce oil modified alkyd resins which are useful in the production of enamels, lacquers, printing inks, and other surface coating materials by use of the oil modified alkyd resin produced in accordance with the present invention. These and other objects of the present invention will be discussed in more complete detail hereinbelow.

Cognizance is taken of the U. S. Patent 2,469,371, issued to Ivor M. Colbeth. In the art prior to Colbeth, it was conventional to react an oil with glycerin wherein the triglyceride was reduced to the monoglyceride. Thereafter the polycarboxylic acid was added to form the alkyd. In the Colbeth reference, methyl esters of oil acids are formed by reacting an oil such as castor oil or linseed oil with methyl alcohol until transesterification reduces the glyceride to glycerin and the methyl esters of the fatty acids contained in the oils. After the methyl ester formation, additional glycerol is added, the methyl alcohol removed and the monoglyceride formed. A polycarboxylic is added and coreacted with the monoglyceride of the oil fatty acids to form the alkyd. This latter process encompasses unnecessary steps and is performed only with considerable diminished flexibility because of the continuing presence of the glycerol from the first monoester formation and because of the necessary use of a polyhydric alcohol having hydroxy groups other than primary hydroxy groups. By practicing the process of the present invention, one must use a monomethyl ester of any of the non-hydroxylated oil fatty acids in the substantially complete absence of any polyhydric alcohol containing any hydroxy groups other than primary hydroxy groups and coesterifying in the presence of a polycarboxylic acid wherein the monomethyl esters undergo transesterification with the aforedefined polyhydric alcohols. The methyl alcohol is then preferably removed.

In order to illustrate the process of the present invention, the following examples are set forth in which all parts are parts by weight. It should be remembered that these examples are set forth solely for the purpose of illustration and any limitations contained therein should not be interpreted as limitations on the case except as indicated in the appended claims.

Example 1

296 parts of phthalic acid anhydride, 260 parts of trimethylol ethane, 208 parts of the methyl esters of coconut oil fatty acids, and 32 parts of methyl esters of cottonseed oil are introduced into a suitable reaction chamber equipped with a thermometer, stirrer, and reflux condenser and the reaction mixture is heated to a temperature of about 235° C., and maintained at that temperature for about 4 hours. The temperature is then raised to about 265° C. and maintained at that temperature for about 3 hours. The completed resin dissolved in xylene had the following characteristics: Acid No. 1.4, viscosity: Z1-Z2 on the Gardner-Holdt scale (at a 65% solids content in the solvent), a color of 6 (Gardner).

Example 2

296 parts of phthalic acid anhydride, 208 parts of glycerin, 208 parts of the methyl esters of cocoanut oil fatty acids and 32 parts of the methyl esters of cottonseed oil fatty acids are charged into a suitable reaction chamber equipped with thermometer, stirrer, and reflux condenser and reacted at 235° C. and heated at that temperature for approximately 4 hours. The resulting resin was very dark, insoluble in xylene and tended to separate into 2 phases on standing.

It will be plainly seen from the example set forth hereinabove that a considerably different result can be accomplished by using a polyhydric alcohol containing only primary hydroxy groups as contrasted with the use of glycerin which contains a hydroxy group other than primary hydroxy groups. The resin produced according to Example 2 was not usable nor desirable whereas the resin produced according to Example 1 was capable of producing films having maximum color retention and heat resistance and had considerable solvent tolerance.

*Example 3*

291 parts of dimethyl phthalate, 102 parts of pentaerythritol, 150 parts of the methyl esters of soya oil fatty acids and 2.42 parts of lead naphthenate are introduced into a suitable reaction chamber equipped with thermometer, stirrer, and reflux condenser and reacted for approximately 4½ hours at a temperature of about 210–240° C. When the viscosity of the resin at 65% solids in xylene reached Z1 on the Gardner-Holdt scale, 3 parts of phthalic anhydride were added and the completed resin was diluted by the addition of xylene to 60% solids. The resin thus produced had the following characteristics: Acid No. 3.5, viscosity: X—(Gardner-Holdt scale) color: 4–5 (Gardner).

It is desirable to remove the methyl alcohol which is released in the course of the reaction in either the process set forth in Example 1 or the process set forth in Example 3.

The polycarboxylic acids used in the practice of the process of the present invention are preferably those which have no unsaturation in the molecule and, more specifically, those which have no active unsaturation in the molecule. Amongst those acids which may be used are phthalic, malic, azelaic, oxalic, malonic, succinic, glutaric, sebacic, adipic, pimelic, suberic, tricarballyic, citric, tartaric, and the like. Obviously, mixtures of these acids, or their anhydrides, or the alkyl esters of these acids, such as the methyl or ethyl esters may be used. The amount of the saturated polycarboxylic acid which may be used in the practice of the process of the present invention may be varied over a fairly wide range such as between about 36 and 63% by weight based on the total weight of the reactants but preferably between about 42% and 56% by weight based on the total weight of the reactants. If it is desired to use minor amounts of unsaturated polycarboxylic acids, one may do so but it is preferred that the total amount of an unsaturated acid be not more than about 10% of the total amount of polycarboxylic acid used.

The methyl esters of non-hydroxylated oil fatty acids which may be used in the practice of the process of the present invention may be obtained by the metholysis of such oils as cocoanut, palm kernel, corn, cottonseed, rape seed, mustard seed, soya, castor, olive, sunflower, chinawood, linseed, perilla, tung, oiticica, sardine, whale, herring, and the like. These methyl esters should be present in an amount varying between about 7% and 45% based on the total weight of the reactants but it is preferred that there be present between about 20–35% by weight of the methyl ester based on the total weight of the reactants. Obviously, these methyl esters may be used singly or in combination with one another, e. g., the methyl ester of the cocoanut oil fatty acids and the methyl ester of the soya oil fatty acids and the like.

Amongst the polyhydric alcohols which may be used are trimethylol propane, trimethylol ethane, pentaerythritol, ethylene glycol, diethylene glycol, tetraethylene glycol, hexaethylene glycol, propanediol, 1,3, butanediol, 1–4, pentanediol, 1–5, dipentaerythritol, and the like. These polyhydric alcohols may be used singly or in combination with one another and should be present in an amount sufficient to enable substantially complete esterification of the acid reactants as well as transesterification of the fatty acid methyl esters. To insure substantially complete esterification, it is generally desired to add about 5 to 30% in excess of the amount of polyhydric alcohol stoichiometrically calculated to produce that desired result.

It is not necessary to use a catalyst in order to accomplish the transesterification of the methyl ester with the polyhydric alcohol, but if desired one may use in catalytic amounts such materials as lead naphthenate, litharge, calcium oxide, calcium naphthenate, calcium hydroxide, sodium hydroxide, sodium carbonate, sodium methylate, lithium naphthenate, lithium hydroxide, lithium carbonate, and the like.

In the preparation of surface coating materials, such as lacquers and varnishes, one may use any of the conventional solvents such as xylene, toluene, or other aromatic hydrocarbon, combinations of aliphatic solvents such as mineral spirits and aromatic solvents, terpenes, esters such as butyl acetate, ethyl lactate, etc. Ketones such as methyl ethyl ketone, diisobutyl ketone, cyclohexanone, etc. Chlorinated solvents, ethylene dichloride, etc. Additionally, one may incorporate into the surface coating compositions of the present invention, such modifiers as pigments, driers, accelerators, and the like. Also one may use the alkyds in admixture with various alkylated melamine-formaldehyde and urea-formaldehyde resins.

We claim:

1. A process for the preparation of an oil modified alkyd resin comprising heat reacting a methyl ester of a non-hydroxylated oil fatty acid, a polycarboxylic acid, and a saturated polyhydric aliphatic alcohol until substantially complete esterification is accomplished wherein said oil acid esters are present in an amount varying between about 7% and 45% by weight based on the total weight of the reactants, said polycarboxylic acid is present in an amount varying between about 63 and 36% based on the total weight of the reactants and wherein said alcohol consists of an alcohol containing only primary hydroxy groups, said alcohol being present in an amount sufficient to permit substantially complete esterification.

2. A process for the preparation of an oil modified alkyd resin comprising heat reacting a methyl ester of a non-hydroxylated oil fatty acid, a polycarboxylic acid, and a saturated polyhydric aliphatic alcohol until substantially complete esterification is accomplished wherein said oil acid esters are present in an amount varying between about 20 and 35% by weight based on the total weight of the reactants, said polycarboxylic acid is present in an amount varying between about 56 and 42% based on the total weight of the reactants and wherein said alcohol consists of an alcohol containing only primary hydroxy groups, said alcohol being present in an amount sufficient to permit substantially complete esterification.

3. A process according to claim 1 in which the polyhydric alcohol is trimethylol ethane.

4. The process according to claim 1 in which the polyhydric alcohol is trimethylol propane.

5. The process according to claim 1 in which the polyhydric alcohol is pentaerythritol.

6. The process according to claim 1 in which the polycarboxylic acid is phthalic acid.

7. The process according to claim 1 in which the oil acid esters are the methyl esters of cottonseed oil fatty acids.

8. The process according to claim 1 in which the oil acid esters are the methyl esters of coconut oil fatty acids.

9. The process according to claim 1 in which the oil acid esters are the methyl esters of soya oil fatty acids.

LEONARD E. CADWELL.
CHARLES FRAZIER.

REFERENCES CITED

The following references are of record in the file of this patent:

UNITED STATES PATENTS

| Number | Name | Date |
|---|---|---|
| 2,469,371 | Colbeth | May 10, 1949 |
| 2,494,366 | Sprules et al. | Jan. 10, 1950 |